Jan. 2, 1973     E. K. FUJIMOTO ET AL     3,708,339
POTASSIUM HYDROXIDE WAFERS AND
PROCESS FOR THEIR PREPARATION
Filed Sept. 8, 1970     2 Sheets-Sheet 1
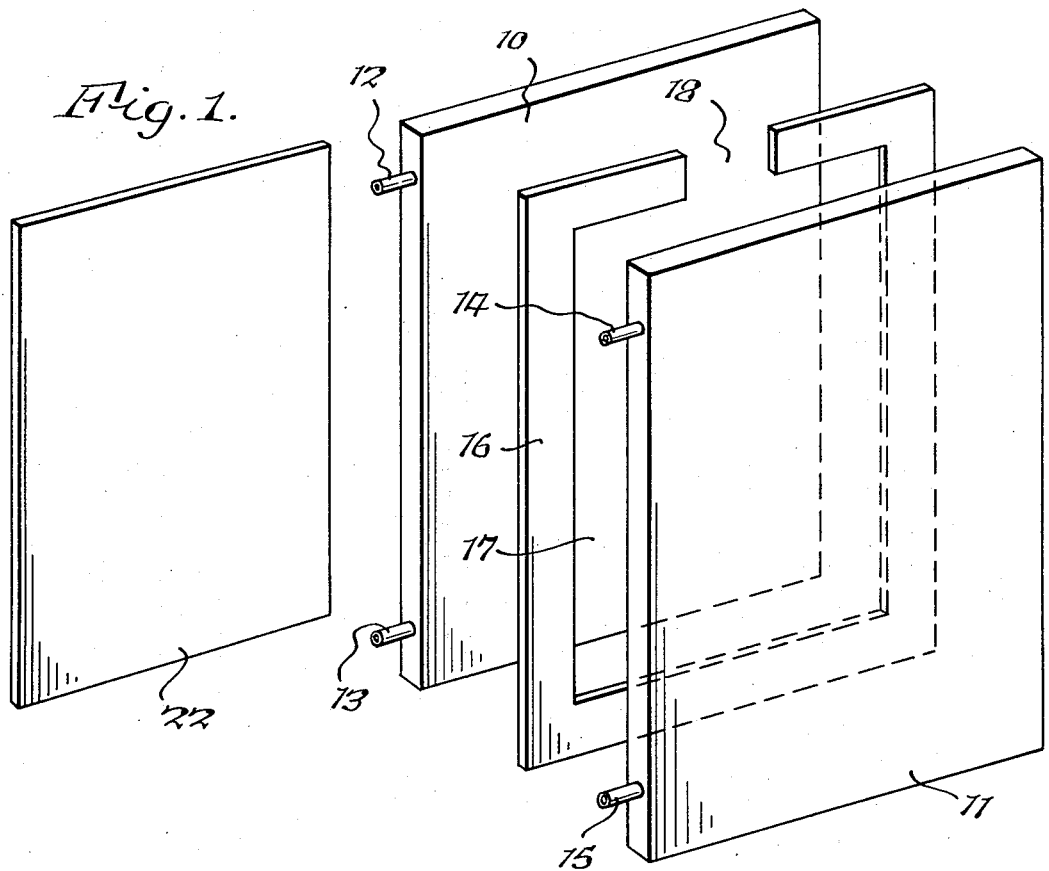
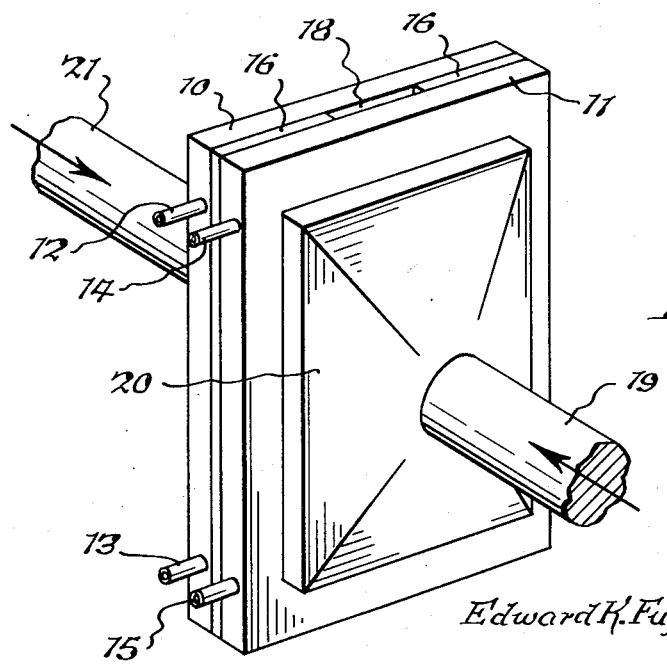
INVENTORS.
Edward K. Fujimoto, Walter R. Buckman &
Edmund J. Grezlikowski
BY    Jay P. Friedenson
ATTORNEY.

United States Patent Office 3,708,339
Patented Jan. 2, 1973

3,708,339
POTASSIUM HYDROXIDE WAFERS AND
PROCESS FOR THEIR PREPARATION
Edward K. Fujimoto, Seabrook, N.J., and Walter R.
Buckman and Edmund J. Grezlikowski, Wilmington,
Del., assignors to Allied Chemical Corporation, New
York, N.Y.
Filed Sept. 8, 1970, Ser. No. 70,296
Int. Cl. C01d 1/00; H01m 29/02
U.S. Cl. 136—153                27 Claims

ABSTRACT OF THE DISCLOSURE

Potassium hydroxide wafers having a thickness of from $\frac{1}{16}$ inch to about $\frac{1}{8}$ inch in which the weight percent of potassium hydroxide is from about 80–87.5, the balance being essentially water, may be prepared by pouring molten potassium hydroxide, having the indicated weight percentage, into a mold defining a cavity the thickness of which is from about $\frac{1}{16}$ inch to about $\frac{1}{8}$ inch, allowing the potassium hydroxide to solidify in the mold, and removing the potassium hydroxide wafers thus formed from the mold. The potassium hydroxide wafers have utility as the electrolyte in zinc-air battery systems.

BACKGROUND OF THE INVENTION

Zinc-air batteries with porous carbon as the cathode structure are well known in the art. Such batteries are characterized by long life and high capacity and are particularly suitable for use in low-drain applications such as in railroad signals and navigational aids. A disadvantage of such batteries is that they are heavy and thus are not readily used in applications requiring high power and low weight. A typical situation in which the combination of high power and low weight is required is in the powering of portable military communications equipment. A power source having high power and low weight could also be advantageously employed in a variety of small electrical equipment such as shavers, portable tape recorders and electronic instruments.

Recently, new zinc-air systems have been designed which employ a fuel-cell type cathode instead of a bulky carbon type electrode. One such design employs a laminar electrode consisting of a gas-permeable hydrophobic backing film, a catalyst layer, and a conductive mesh, as disclosed in Chemical and Engineering News, Oct. 27, 1969, page 48. In such systems, oxygen from the air is the actual cathodic material, thereby obviating the necessity for consumable carbon-type electrodes. Consequently, the batteries are extremely light in weight. The anode of the zinc-air battery systems can be made of pressed zinc powder with a filler incorporated to give the desired degree of porosity. The anode, wrapped in suitable separator materials, as plastic, and containing potassium hydroxide electrolyte in solid form, is inserted into the cathode box which is filled with water. This activates the cell. After the cell is discharged, the spent anode may be removed and replaced with a fresh one. The cathode will last for numerous anode replacements. Quick recharging by such anode replacement offers substantial savings by reducing maintenance and eliminating the need for electrical recharging equipment.

Unfortunately, potassium hydroxide is not available in a solid form which is convenient for use in the above-described battery systems. The spacing between the anode members is critical, as is the weight of the potassium hydroxide needed as the electrolyte. Pelletized forms of potassium hydroxide are too large to fit into the anode chambers and granulated forms are difficult to add to the narrow anode chambers in the proper amounts.

It is a major object of this invention to provide a solid form of potassium hydroxide of desired weight and shape for use as electrolyte charge to the anode chambers of the above-described zinc-air battery type systems.

It is another object of this invention to provide a method for manufacturing such solid shapes of potassium hydroxide which can reliably produce large numbers of these members of the desired shape and weight without excessive scrapping or rejects.

Other objects and advantages of the invention will become apparent from the forthcoming description.

BRIEF DESCRIPTION OF THE DRAWINGS

FIG. 1 is a front elevational view of a solid wafer form of potassium hydroxide in accordance with the invention.

FIG. 2 is an exploded view, in perspective, showing the mold used for manufacturing the potassium hydroxide wafer members comprising two water-cooled plates and a pattern sandwiched between for the desired shape and size.

FIG. 3 is an elevational view, in perspective, of the mold of FIG. 2, in closed position, showing two rams and one ram plate which are used for the purpose of applying pressure to the mold.

SUMMARY OF THE INVENTION

Figure 4:
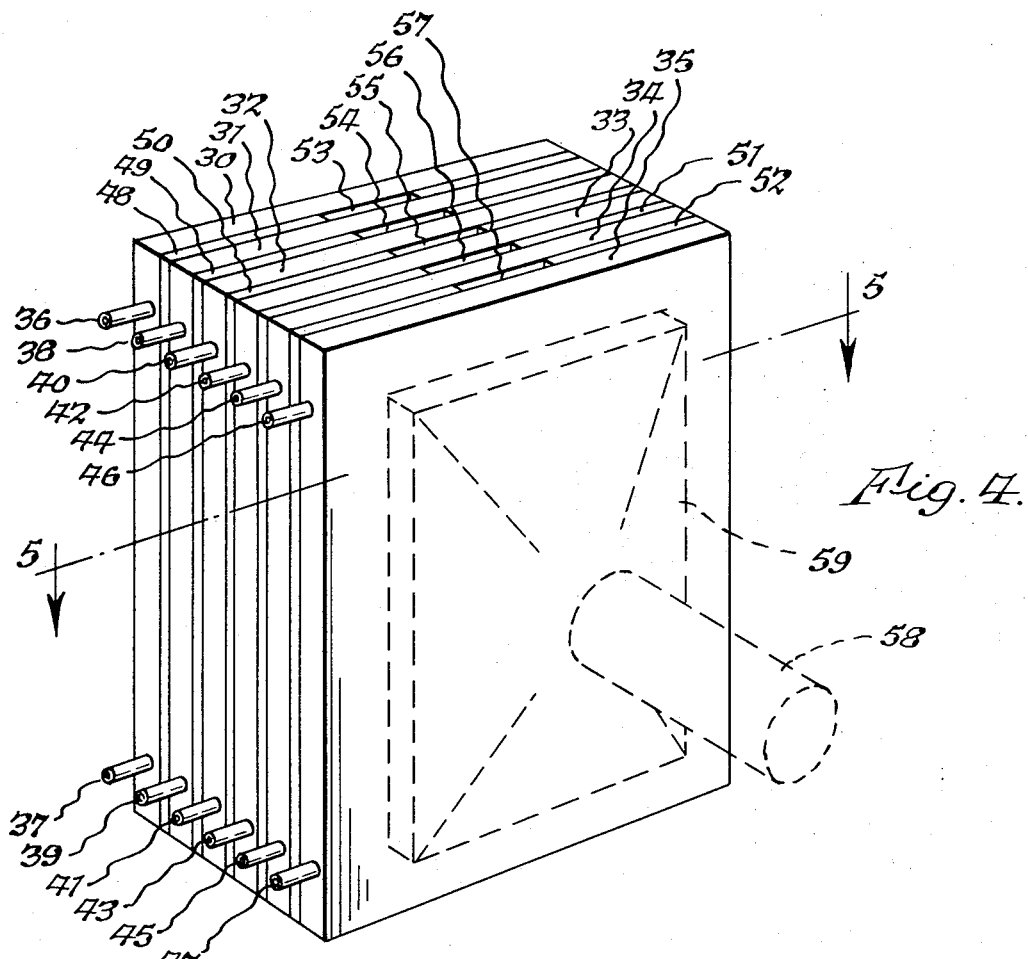
FIG. 4 is an elevational view, in perspective, of a plurality of water-cooled molds as shown in FIGS. 2 and 3, mounted together with one ram and ram plate for illustration.

We have discovered that the objects of the invention may be accomplished by molding potassium hydroxide (KOH) into a solid wafer form having a narrow, critically defined weight content of KOH in relation to the thickness of the wafer.

By wafer is intended thin shapes or sheets of solid potassium hydroxide having a substantially uniform thickness.

By weight content of KOH is intended to mean that the balance of the weight is essentially water.

The dimensional and weight requirements of KOH wafers in accordance with the invention for use in zinc-air battery systems are very stringent. The maximum thickness desired for the wafers ranges from about $\frac{1}{16}$ inch to about $\frac{1}{8}$ inch.

Many attempts to manufacture KOH wafers having a thickness within this range have resulted in failure for one or more of the following reasons: One type of failure is the inability of the molten KOH which is poured into the mold to completely fill the narrow cavity of the mold. The result is a molded "wafer" which is full of holes or which has large sections missing and which does not therefore meet the minimum weight requirement for the wafer, or which will not hold up under handling. Another type of failure is the obtainment of a wafer product containing faults or cracks which result in breakage and loss in shipping or handling. Another source of failure is the production of wafers which stick to the mold and which will not release properly. Such wafers cannot be recovered in an integral form from the mold and thus provide another source of scrap or rejects in commercial production.

We have discovered that if the weight percent of KOH in the molten KOH charged to the mold is from about 80–87.5, the balance being essentially water, KOH wafers having a thickness from about $\frac{1}{16}$ inch to about $\frac{1}{8}$ inch may be reliably prepared without excessive rejects, in integral form, without holes or missing sections, without faults or cracks that will result in excessive breakage, and which wafers readily release from the molds after the forming operation.

Thus, one aspect of the invention is the provision of a KOH wafer product having a thickness of from about 1/16 inch to 1/8 inch, in which the weight percent of KOH is from about 80–87.5, the balance being essentially water. For some unexplained reason, we have been unable to manufacture KOH wafer products in which the weight percent of KOH in the wafer exceeds 87.5. The criticality of the weight percent of KOH is even more pronounced in the case of wafers which are about 1/16 inch in thickness. In this case, efforts to make wafers with molten KOH in which the weight percent KOH is less than about 84 or more than about 86.5, were unsuccessful.

In another aspect of the invention, a method is provided for manufacturing KOH wafers of the type described in a reliable fashion with a minimum of rejects due to faults or cracks, failure to fill the mold or failure to release promptly from the mold. The method comprises essentially pouring molten KOH having a weight percent of KOH from about 80–87.5, the balance being essentially water, into a mold defining a cavity, the thickness of which is from about 1/16 inch to about 1/8 inch, allowing the KOH to solidify in the mold, and removing the KOH wafer thus formed from the mold.

This procedure will work satisfactorily, without additional considerations, for single cavity molds having about 1/4 inch Monel side-walls, but will not work satisfactorily for multiple-cavity molds. After much experimentation, it was found that a critical cool-down condition must be satisfied before a molding procedure, as described above, will reliably produce KOH wafers of the type described with a minimum of scrapping or rejects. Accordingly, another aspect of the invention lies in the provision of a molding procedure incorporating a critical cool-down step which comprises cooling the cavities of a mold to below 150° F. within three minutes after pouring the liquid KOH into the mold. This will inherently take place in a single-cavity mold having 1/4 inch Monel side-walls under normal conditions, but in other molds, such as multiple-cavity molds, some positive cooling means must be provided, particularly for the inner cavities, to satisfy this condition.

DETAILED DESCRIPTION OF THE INVENTION AND OF THE PREFERRED EMBODIMENTS

Although the wafer may be from about 1/16 to 1/8 inch in thickness, the preferred thickness is 1/16 inch ±0.002. The wafers are preferably essentially rectangular in shape and, still preferably, do not exceed about 10 inches in length and 6 inches in width. The present specifications for a prototype wafer call for a length of about 7 1/4 inches ±1/16 inch and a width of about 4 7/8 inches ±1/16 inch.

For wafers of about 1/8 inch thickness, the preferred weight percent of KOH in the wafer is from about 84–87. Attempts to manufacture wafers of 1/8 inch thickness having weight percents significantly in excess of 87 have resulted in failure.

For KOH wafers having the preferred thickness of about 1/16 inch, the preferred weight percent of KOH is from about 84–86.5. Even more preferably, the weight percent of KOH in wafers having a thickness of about 1/16 inch, is from about 85–86.

The invention will now be described more particularly by reference to the drawings. With reference to FIGS. 2 and 3, a typical single-cavity mold suitable for use in accordance with the process of the invention is constructed of rectangular Monel plates 10 and 11 which, for illustrative purposes, may each be 6 inches by 9 inches by 1/4 inch. The Monel plates may optionally be hollowed to form a water-jacket for cooling purposes, in which case water circulating pipes 12, 13, 14 and 15 may be provided. In a single-cavity mold, as shown in FIGS. 2 and 3, this is not essential as adequate cooling of the mold cavity is provided by the atmosphere if at normal temperatures. However, if the ambient temperature is very high or if other circumstances prevent cooling of the cavities to below 150° F. within three minutes after pouring, it may be necessary to provide some auxiliary means of cooling. This auxiliary means may comprise any conventional means such as air cooling or liquid cooling by contacting the mold in a bath of liquid or by circulating liquid through hollowed wall plates of the molds themselves such as is illustrated in the drawings. Between Monel plates 10 and 11 is placed a rectangular sheet 16 constructed of a material, such as polytetrafluoroethylene, which has a low surface energy to facilitate release of the molded product. Polytetrafluoroethylene sheet 16 has a portion cut away (shown by 17) to form the desired pattern for the molded product. Element 16 will hereafter be referred to as the pattern. In addition, a gate (shown by 18) is cut through a portion of pattern 16 to allow entrance of the KOH melt. For illustrative purposes, a typical pattern comprises a 6 inch by 9 inch by 1/16 inch polytetrafluoroethylene sheet from which a central portion 4 7/8 inches by 7 1/4 inches is cut away. The gate width is one inch.

The mold is closed, as shown in FIG. 3, and pressure is applied, as shown by the arrows in FIG. 3, to form a fluid-tight mold cavity. Any suitable means may be employed to hold the mold plates together, such as clamps, bolts or the like, but a convenient form for large scale production, as shown in FIG. 3, comprises first ram 19, first ram plate 20, second ram 21 and a second ram plate not shown in the drawings.

KOH is melted, preferably to a temperature between 300–620° F., and is funneled into the mold cavity through gate 18. An even more preferred melt temperature for pouring is from 380–420° F. In the single-cavity mold, as shown in FIGS. 2 and 3, and with the exemplary mold dimensions and materials described, adequate cool-down of the mold cavity after pouring the melt will take place. The temperature of the mold cavity, as measured at the gate thereof, should be below about 150° F. within 3 minutes after completion of pouring of the melt. In the event this condition is not achieved in a given single-cavity mold, this condition should be created at the gate within the time prescribed by suitable cooling procedures as described herein, or other conventional methods.

Upon completion of the molding operation, the mold is disassembled and the product wafer 22 is removed.

Figure 5:
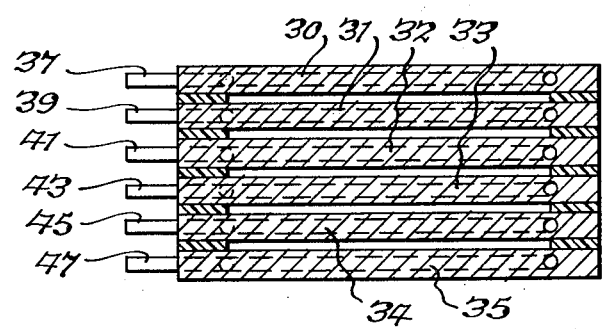
FIG. 5 is a top view of the multiple cavity mold of FIG. 4 taken along line 5—5 of FIG. 4 showing the spacing of the mold cavities and excluding the ram plate and ram.

FIGS. 4 and 5 show a multiple-cavity mold having 5 cavities, 30, 31, 32, 33, 34 and 35 are the Monel plates which are hollowed to form waterjackets. Water circulating pipes 36 and 37, 38 and 39, 40 and 41, 42 and 43, 44 and 45 and 46 and 47 are provided to supply cooling water to hollowed plates 30, 31, 32, 33, 34 and 35, respectively. Alternative or supplementary cooling means may be provided such as by flowing air over the mold or adjusting the melt temperature. The polytetrafluoroethylene patterns are shown by 48, 49, 50, 51 and 52. The gates of the mold are shown by 53, 54, 55, 56 and 57. Ram 58 applies pressure on ram plate 59 to supply the needed pressure to hold the mold closed. The opposing ram and ram plate are not shown. After the molding operation, the mold is disassembled and the KOH wafers may be removed.

Example 1

100 grams of 85 weight percent KOH pellets having a carbonate content below 1% were melted in a nickel crucible and heated to 420° F. The resulting KOH melt was then poured into a single-cavity vertical mold as shown in FIGS. 2 and 3, and as described above, except that the Monel plates were solid and were not water cooled. The mold pressure was applied by a number of clamps evenly spaced around the mold. After an elapse of one minute after completion of pouring, the temperature at the gate of the mold was 150° F. After an elapse of 3 minutes, the gate temperature was 125° F. The mold was disassembled at the end of a total elapsed time from pouring of 10 minutes with a gate temperature of 110° F. The KOH wafer product released easily on separating from the gate area. The wafer product weighed about 70 grams with a KOH weight percent of about 85.

Example 2

The mold used was a 7-cavity mold of alternating 6 inches by 9 inches by ¼ inch Monel plates and 6 inches by 9 inches by 1/16 inch polytetrafluoroethylene patterns having central portions 4⅞ inches by 7¼ inches cut away. No auxiliary cooling was provided for the mold cavities.

560 grams of 85 weight percent KOH pellets were melted in a nickel crucible and heated to 420° F. The resulting KOH melt was then poured into the 7 cavities of the mold. Gate temperature after one minute was 225° F. After 3 minutes the gate temperature was 170° F. After 10 minutes the gate temperature was 135° F. At the end of this period the mold was disassembled. All 7 KOH wafers adhered to the mold and attempts to free the same resulted in breakage of the wafers.

Example 3

The procedure of Example 2 was repeated except that the mold was a 7-cavity mold consisting of a series of single cavity molds having 6 inches by 9 inches by ¼ inch Monel plate side-walls. After one minute, the gate temperature was 155° F. After 3 minutes the gate temperature was 135° F. When the mold was disassembled at the end of the 10 minute period with a gate temperature of 110° F., the wafers released easily upon separating from the gate area.

Examples 2 and 3 above demonstrate the criticality of having the gate temperature below 150° F. within 3 minutes after pouring in order to achieve easy release of the wafers from the mold. The double thickness of the Monel side-wall plates in Example 3 apparently provided additional heat exchange surface which resulted in the gate temperatures dropping faster than was the case in Example 2.

The following examples demonstrate the criticality of the weight percent of KOH in the melt charged to the mold and its relationship to the thickness of the wafer products. In all cases, the mold was a 7-cavity mold as described in Example 3 consisting of a series of single-cavity molds. The thicknesses of the 6 inches by 9 inches polytetrafluoroethylene patterns, the differences in the charges and the differences in the results obtained are summarized in the following table.

The assay of the KOH used before dilution, if any, was 88.25 weight percent. The KOH had a $K_2CO_3$ content of about .44%.

For the purposes of these tests, an acceptable result was one in which at least four out of the seven mold cavities produced integral KOH wafer products which released easily from the mold, which had the desired weight and shape, and which were free of significant cracks or faults which would be likely to result in breakage on handling.

| Example No. | Thickness of pattern (inches) | Weight of KOH charged (grams) | Weight of water added (grams) | KOH assay (weight percent) | Results obtained |
|---|---|---|---|---|---|
| 4 | 1/16 | 560 | 21 | 85 | Acceptable—All mold cavities filled completely. All 7 wafers released easily to obtain 7 satisfactory products. |
| 5 | 1/16 | 560 | 7.5 | 87 | Not acceptable—None of the mold cavities filled properly. The KOH melt solidified before the cavities were filled. Products obtained were finger-like and had large areas missing. |
| 6 | 1/16 | 560 | 41 | 82 | Not acceptable—3 out of 4 cavities did not fill satisfactorily. In these 3 cavities, wafer products stuck to the mold upon removal, resulting in wafer products having sections missing and having numerous fault lines or cracks. Only 1 satisfactory wafer product was obtained. |
| 7 | 1/16 | 560 | 28 | 84 | Acceptable—3 cavities out of 7 did not fill properly. The wafer products from these cavities broke on removal from the mold. The wafer products from the remaining 4 cavities were acceptable, even though they contained some small air holes. |
| 8 | 1/16 | 560 | 14.4 | 86 | Acceptable—One cavity did not fill completely and wafer product broke upon removal from the mold. The remaining 6 cavities produced satisfactory wafer products which released readily from the mold. |
| 9 | ⅛ | 1,120 | 42 | 85 | Acceptable—7 satisfactory wafer products released readily from the mold cavities. |
| 10 | ⅛ | 1,120 | 15 | 87 | Acceptable—One cavity did not fill completely and the wafer product broke upon removal from the mold. The remaining cavities yielded satisfactory wafer products which released readily from the mold. |
| 11 | ⅛ | 1,120 | 82 | 82 | Acceptable—6 satisfactory wafer products were obtained which released readily from the mold. One wafer product was obtained with a fault line which broke open later upon handling. |
| 12 | ⅛ | 1,120 | 0 | 88.2 | Not-acceptable—The cavities did not fill completely. All wafer products broke when attempts were made to remove them from the mold. No satisfactory wafer product was obtained. |
| 13 | ⅛ | 1,120 | 108 | 80 | 7 satisfactory products were obtained. |

The above data show that in the case of wafers having about 1/16 inch thickness, an acceptable recovery of KOH wafers was obtained when the weight percent of KOH charged to the mold was in the range of 84–86%. Unsatisfactory results were obtained when the assay was as low as 82% and as high as 87%. By interpolation, the operable weight percent range of the KOH charge was determined to be from 84–86.5, with the range of 85–86 being preferred.

In the case of potassium hydroxide wafer products having a thickness of about ⅛ inch, satisfactory results were obtained when the KOH weight percent range was between about 80–87. At 88.2 weight percent, an unacceptable result was obtained. By interpolation, the upper workable limit was determined to be 87.5. Since products having the desired weight cannot be obtained with a weight percent of KOH below about 80, this was assigned as the bottom limit.

We claim:

1. A wafer of potassium hydroxide having a thickness of from about 1/16 inch to about ⅛ inch in which the weight percent of potassium hydroxide is from about 80–87.5, the balance being essentially water.

2. A wafer of potassium hydroxide, as described in claim 1, having a thickness of about ⅛ inch.

3. A wafer of potassium hydroxide, as described in claim 2, which is essentially rectangular in shape.

4. A wafer of potassium hydroxide, as described in claim 3, which does not exceed about 10 inches in length and about 6 inches in width.

5. A wafer of potassium hydroxide, as described in claim 4, in which the weight percent of potassium hydroxide is from about 84–87.

6. A wafer of potassium hydroxide, as described in claim 1, having a thickness of about 1/16 inch.

7. A wafer of potassium hydroxide, as described in claim 6, in which the weight percent of potassium hydroxide is from about 84–86.5.

8. A wafer of potassium hydroxide, as described in claim 7, in which the weight percent of potassium hydroxide is from about 85–86.

9. A wafer of potassium hydroxide, as described in claim 7, which is essentially rectangular in shape.

10. A wafer of potassium hydroxide, as described in claim 9, which does not exceed about 10 inches in length and about 6 inches in width.

11. A wafer of potassium hydroxide, as described in claim 8, which is essentially rectangular in shape.

12. A wafer of potassium hydroxide, as described in claim 11, which does not exceed about 10 inches in length and about 6 inches in width.

13. The process for preparing a wafer of potassium hydroxide which comprises:
  (a) pouring molten potassium hydroxide having a weight percent of potassium hydroxide from about 80–87.5, the balance being essentially water, into a mold defining a cavity, the thickness of which is from about 1/16 inch to about 1/8 inch,
  (b) cooling the cavity of the mold to below 150° F. within 3 minutes after pouring of the molten potassium hydroxide into the mold and allowing the potassium hydroxide to solidify in the mold, and
  (c) removing the potassium hydroxide wafer thus formed from the mold.

14. The process according to claim 13 in which the mold cavity defines a thickness of about 1/8 inch.

15. The process according to claim 14 in which the mold cavity is essentially rectangular in shape.

16. The process according to claim 15 in which the mold cavity defines a length which does not exceed about 10 inches and a width which does not exceed about 6 inches.

17. The process according to claim 13 in which the mold defines a plurality of cavities each of which cavities defines a thickness of about 1/8 inch.

18. The process according to claim 17 in which each cavity defines a length which does not exceed about 10 inches and a width which does not exceed about 6 inches.

19. The process according to claim 13 in which the mold defines a cavity having a thickness of about 1/16 inch.

20. The process according to claim 19 in which the weight percent of the potassium hydroxide charged to the mold is about 84–86.5.

21. The process according to claim 20 in which the mold defines a cavity which is essentially rectangular in shape.

22. The process according to claim 21 in which the mold cavity defines a length which does not exceed about 10 inches and a width which does not exceed about 6 inches.

23. The process according to claim 13 in which the mold defines a plurality of cavities in which the dimensions of each cavity are about 1/8 inch in thickness, no more than about 10 inches in length and no more than about 6 inches in width.

24. The process according to claim 23 in which each cavity defines a length which does not exceed about 10 inches and a width which does not exceed about 6 inches.

25. The process according to claim 19 in which the weight percent of potassium hydroxide charged to the mold is from about 85–86.

26. The process according to claim 25 in which the mold defines a cavity which is essentially rectangular in shape.

27. The process according to claim 26 in which the mold cavity defines a length which does not exceed about 10 inches and a width which does not exceed about 6 inches.

References Cited
UNITED STATES PATENTS

| | | | |
|---|---|---|---|
| 1,816,043 | 7/1931 | Fales | 23—184 |
| 2,077,561 | 4/1937 | Heise | 136—136 |
| 3,291,576 | 12/1966 | Otrhalek | 23—302 |
| 3,531,327 | 9/1970 | Moos | 136—86 A |

DONALD L. WALTON, Primary Examiner

U.S. Cl. X.R.

23—184; 136—136